United States Patent
Wei et al.

(10) Patent No.: US 11,254,621 B2
(45) Date of Patent: Feb. 22, 2022

(54) VERTICAL GAS DISTRIBUTION DEVICE FOR AEROBIC COMPOST AND GAS DISTRIBUTION METHOD

(71) Applicant: Northeast Agricultural University, Harbin (CN)

(72) Inventors: Zimin Wei, Harbin (CN); Beidou Xi, Beijing (CN); Baiyan Cai, Harbin (CN); Xu Zhang, Harbin (CN); Dan Wei, Harbin (CN); Liming Jia, Harbin (CN); Xinyu Zhao, Beijing (CN); Mingxiao Li, Beijing (CN); Tianxue Yang, Beijing (CN); Yue Zhao, Harbin (CN)

(73) Assignee: Northeast Agricultural University, Harbin (CN)

( * ) Notice: Subject to any disclaimer, the term of this patent is extended or adjusted under 35 U.S.C. 154(b) by 248 days.

(21) Appl. No.: 16/001,563

(22) Filed: Jun. 6, 2018

(65) Prior Publication Data
US 2019/0023625 A1   Jan. 24, 2019

(30) Foreign Application Priority Data
Jul. 21, 2017   (CN) .......................... 201710599107.6

(51) Int. Cl.
 C05F 17/979   (2020.01)
 C05F 9/02     (2006.01)
 C05F 17/907   (2020.01)

(52) U.S. Cl.
 CPC .............. *C05F 17/979* (2020.01); *C05F 9/02* (2013.01); *C05F 17/907* (2020.01); *Y02W 30/40* (2015.05)

(58) Field of Classification Search
 CPC ........ C05F 17/979; C05F 17/907; C05F 9/02; Y02W 30/43
 See application file for complete search history.

(56) References Cited

U.S. PATENT DOCUMENTS

| 4,326,874 A * | 4/1982 | Burklin ................. C05F 17/70 71/9 |
| 2011/0204529 A1* | 8/2011 | Kerkhoff ................ E03F 3/046 261/30 |

FOREIGN PATENT DOCUMENTS

| CN | 201746473 U | 2/2011 |
| CN | 203653451 U | 6/2014 |

(Continued)

OTHER PUBLICATIONS

Machine Translation of CN 105254362 from EPO accessed Jun. 2020 (Year: 2020).*
Machine translation of CN 106905008 (Year: 2021).*

*Primary Examiner* — William H. Beisner
*Assistant Examiner* — Danielle B Henkel
(74) *Attorney, Agent, or Firm* — Troutman Pepper Hamilton Sanders LLP; Christopher C. Close, Jr.

(57) ABSTRACT

The present invention provides a vertical gas distribution device for aerobic compost and a gas distribution method. Current gas distribution pipelines are easily blocked by organic materials, resulting in poor ventilation due to non-uniform local ventilation and cleaning difficulties. The inventive device comprises a compost chamber, a compost bin, a compost heap, a percolate tank, and a plurality of gas distribution branch pipes at the bottom of the compost chamber, the pipes being vertically movable in the chamber; the percolate tank is positioned at the bottom of the chamber and under the pipes; an air inlet is provided on the side wall of the tank, and an outlet is provided on the side wall of the chamber; the compost bin is inside the compost chamber, and the compost heap is in the compost bin; each pipe is top sealed, with a plurality of vent holes on the side wall, and its bottom connected to the tank. The present invention is usable for compost ventilation.

5 Claims, 3 Drawing Sheets

(56) References Cited

FOREIGN PATENT DOCUMENTS

| | | | | |
|---|---|---|---|---|
| CN | 105254362 | * | 1/2016 | .............. C05F 17/02 |
| CN | 205205039 U | | 5/2016 | |
| CN | 205933659 U | | 2/2017 | |
| CN | 106905008 | * | 6/2017 | .............. C05T 17/60 |
| JP | 2006/104032 A | | 4/2006 | |

* cited by examiner

VERTICAL GAS DISTRIBUTION DEVICE FOR AEROBIC COMPOST AND GAS DISTRIBUTION METHOD

CROSS-REFERENCE TO RELATED APPLICATION

This application claims priority from Chinese patent application no. 201710599107.6, filed on Jul. 21, 2017.

TECHNICAL FIELD

The present invention particularly relates to a vertical gas distribution device for aerobic compost and a gas distribution method thereof.

BACKGROUND

During the treatment of organic solid wastes, ventilation is essential. Current ventilation processes mainly comprise turning ventilation and forced ventilation. Currently, forced ventilation mainly comprises two gas distribution modes. A first mode is to insert or pre-embed a holed pipe of metal or other materials into a heap and connect the pipe with an air blower. In this mode, the vent hole will be blocked by organic materials, such that the ventilation effect is reduced and at the same time the gas distribution is non-uniform due to small surface area of the pipe. In A second mode, a gas distribution channel is pre-formed on ground for a fermentation tank. When using the gas distribution channel of this mode, the pipe will be completely blocked for long-term use due to falling of organic materials into the pipe, resulting in non-uniform local ventilation, difficult cleaning and reduced ventilation effect. In both gas distribution modes, the effect will be reduced due to obstructed pipe ventilation.

SUMMARY

An object of the present invention is to provide a vertical gas distribution device for aerobic compost and a gas distribution method thereof, so as to solve the problem that current gas distribution pipelines ventilated forcibly are easily blocked by organic materials, resulting in non-uniform local ventilation, difficult cleaning and poor ventilation effect.

The technical solutions used for solving the above technical problem are as follows.

A vertical gas distribution device for aerobic compost, comprising a compost chamber, a compost bin, a compost heap, a percolate tank and a plurality of gas distribution branch pipes, wherein the plurality of gas distribution branch pipes are disposed at a bottom of the compost chamber, each gas distribution branch being movable up and down along a height direction of the compost chamber; the percolate tank is positioned at the bottom of the compost chamber and right under the plurality of gas distribution branch pipes; an air inlet is provided on a side wall of the percolate tank; a gas outlet is provided on a side wall of the compost chamber; the compost bin is inside the compost chamber, and the compost heap is provided in the compost bin;

wherein a top end of each gas distribution branch pipe is a sealed end, a plurality of vent holes being provided on a side wall of each gas distribution branch pipe, and a bottom end of each gas distribution branch pipe being in communication with the percolate tank.

In a preferred embodiment of the vertical gas distribution device for aerobic compost, each vent hole is a tapered hole; an end with a small opening of the vent hole is disposed on an outer wall of the gas distribution branch pipe, and an end with a large opening of the vent hole is disposed on an inner wall of the gas distribution branch pipe.

In a preferred embodiment of the vertical gas distribution device for aerobic compost, each gas distribution branch is movable up and down along the height direction of the compost chamber under driving of an elevator mechanism.

In a preferred embodiment of the vertical gas distribution device for aerobic compost, a bottom ring is correspondingly disposed at a bottom of each gas distribution branch pipe, each bottom ring configured to be coaxial with its corresponding gas distribution branch pipe, and each bottom ring being provided with a plurality of percolate discharge holes along its circumferential direction.

In a preferred embodiment of the vertical gas distribution device for aerobic compost, each percolate discharge hole is disposed along a width direction of the bottom ring in which it is positioned, and the compost bin is in communication with the percolate tank through the plurality of vent holes and the plurality of percolate discharge holes of each gas distribution branch pipe.

In a preferred embodiment of the vertical gas distribution device for aerobic compost, a percolate discharge outlet is provided on the percolate tank.

In a preferred embodiment of the vertical gas distribution device for aerobic compost, the gas distribution method is as follows:

a compost heap in a compost bin produces a pressure due to temperature increase;

when the compost heap in the compost bin requires gas supply, a large number of hot gas produced moves up and is discharged out of a compost chamber through a gas outlet as a temperature of the compost heap in the compost bin increases, and air outside the compost chamber is drawn into a plurality of gas distribution branch pipes through an air inlet in a negative pressure oxygen supply manner; at this moment, each gas distribution branch pipe is controlled to move up vertically by an elevator mechanism, such that the air inlet, a percolate tank and the plurality of gas distribution branch pipes form an air communication channel, air is drawn from an outside of the compost chamber into the air inlet in a negative pressure oxygen supply manner, and the air entering the percolate tank through the air inlet is then blown into each gas distribution branch pipe in a positive pressure oxygen supply manner, and finally blown into the compost bin, thereby achieving circulating ventilation of the compost bin; and when the compost heap in the compost bin does not require gas supply, each gas distribution branch pipe is controlled to move down vertically by the elevator mechanism until the plurality of gas distribution branch pipes move down to be coplanar with a bottom of the compost bin, such that a percolate produced by the compost heap in the compost bin is discharged into the percolate tank through a plurality of percolate discharge holes of each gas distribution branch pipe, and the percolate in the percolate tank are pooled and finally discharged out of the compost chamber through a percolate discharge outlet.

The present invention has the following advantageous effects.

1. The structure of the present invention is reasonably designed and simple. The ventilation effect is effectively achieved through the cooperation of the air inlet, the percolate tank, the compost bin and the plurality of gas distribution branch pipes; the ventilation effect is stable and lasting.

2. The structure of the gas distribution branch pipe is reasonably designed and simple to use. Through the configurations of structure and shape of the vent hole itself, particles of the compost heap into the gas distribution branch pipe during ventilation can be reduced to the greatest extent, and blockage of the vent hole can be effectively avoided, ensuring the long-term high quality ventilation effect of the present invention.

3. The gas distribution effect of the present invention is uniform. The uniform ventilation effect can be ensured through the configurations of the positions of the plurality of gas distribution branch pipes and the positions of the plurality of vent holes on each gas distribution branch pipe.

4. The gas distribution method of the present invention is a circulating ventilation method achieved by a pressure difference caused by the temperature difference between the inside and outside of the compost chamber as a driving force. The effective ventilation effect on the compost heap is achieved through the cooperation of the air inlet, the percolate tank, the plurality of gas distribution branch pipes, the compost bin and the gas outlet, and the ventilation process is simple and rapid.

5. The present invention does not require man power needed in forced ventilation on the compost heap, and has advantages of uniform gas distribution, reduced turning times, improved heap turning effect, reduced energy consumption and costs. The vertical gas distribution device avoids the influence of the gas distribution device on the compost discharge from the compost bin.

DETAILED DESCRIPTION

Figure 1:
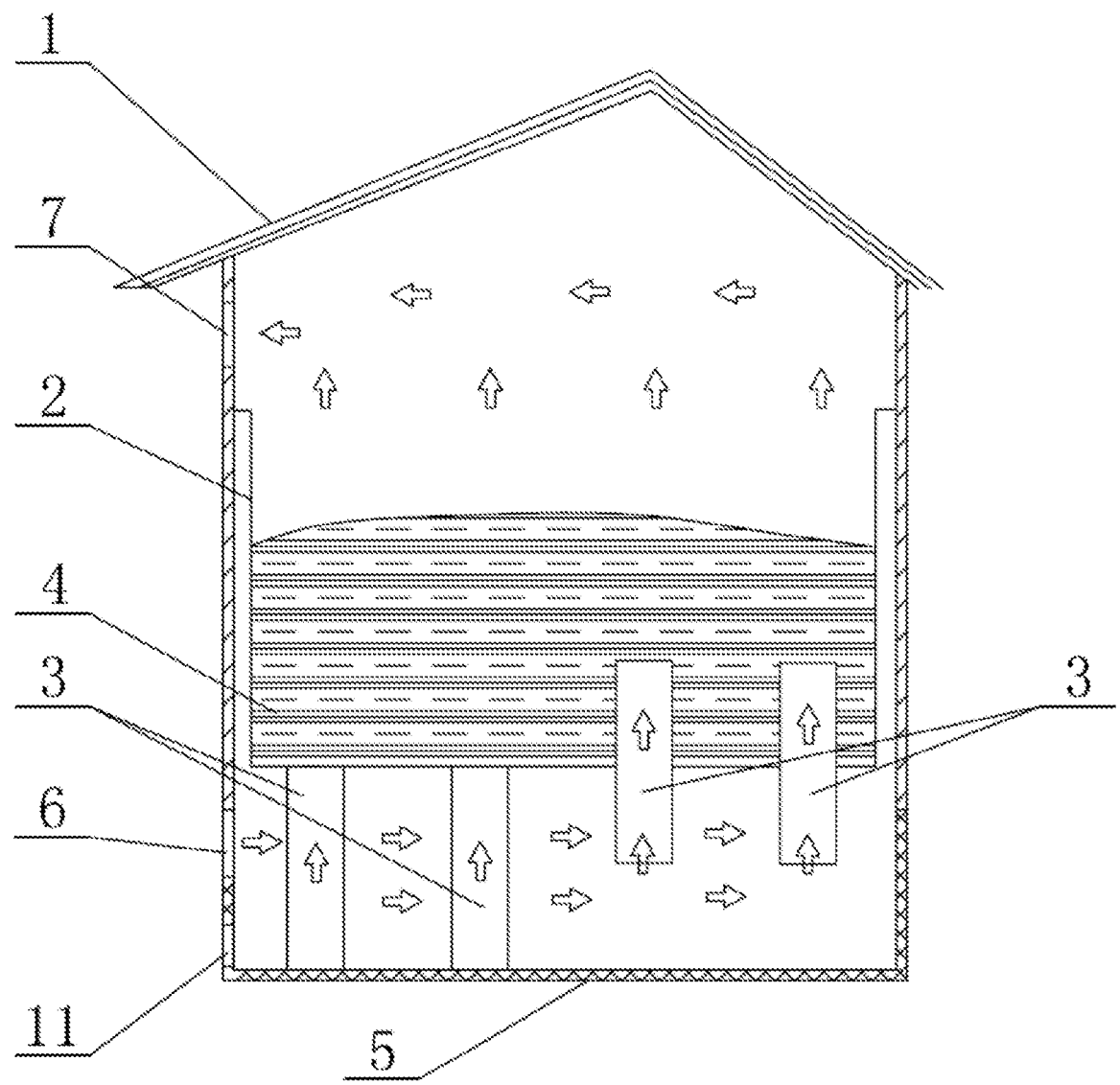
FIG. 1 is an elevation sectional view of the present invention, in which the arrow directions represent the gas flow direction.
Figure 2:
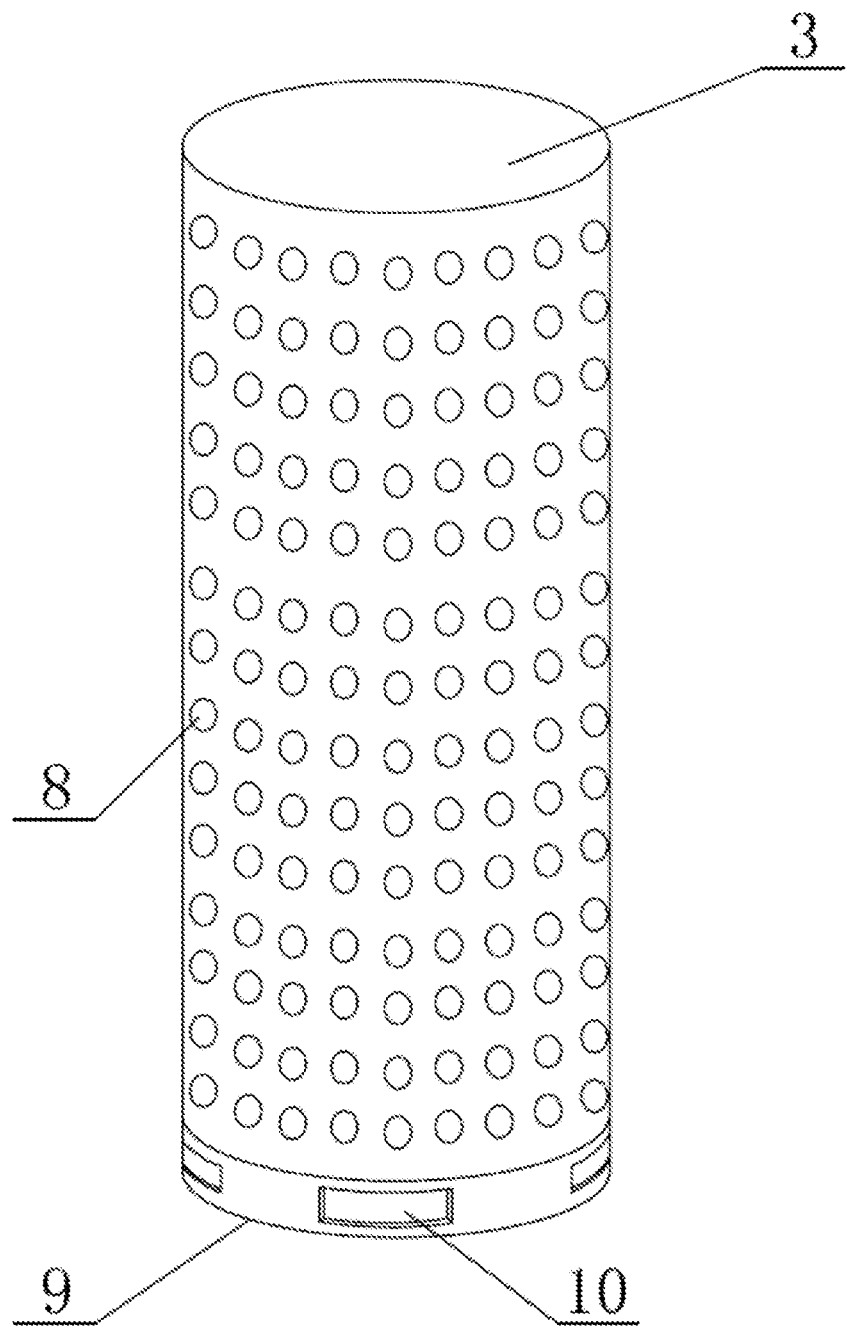
FIG. 2 is a perspective view of a gas distribution branch pipe 3.

Embodiment I: this embodiment is described with reference to FIGS. 1 and 2, and in this embodiment, a vertical gas distribution device for aerobic compost comprises: a compost chamber 1, a compost bin 2, a compost heap 4, a percolate tank 5 and a plurality of gas distribution branch pipes 3, wherein the plurality of gas distribution branch pipes 3 are disposed at a bottom of the compost chamber 1, each gas distribution branch pipe 3 being movable up and down along a height direction of the compost chamber 1; the percolate tank 5 is positioned at the bottom of the compost chamber 1 and right under the plurality of gas distribution branch pipes 3; an air inlet 6 is provided on a side wall of the percolate tank 5; a gas outlet 7 is provided on a side wall of the compost chamber 1; the compost bin 2 is inside the compost chamber 1, and the compost heap 4 is provided in the compost bin 2;

wherein a top end of each gas distribution branch pipe 3 is a sealed end; a plurality of vent holes 8 are provided on a side wall of each gas distribution branch pipe 3, and a bottom end of each gas distribution branch pipe 3 is in communication with the percolate tank 5.

Embodiment II: this embodiment is described with reference to FIG. 2, and in this embodiment, each vent hole 8 is a tapered hole; an end with a small opening of the vent hole 8 is disposed on an outer wall of the gas distribution branch pipe 3, and an end with a large opening of the vent hole 8 is disposed on an inner wall of the gas distribution branch pipe 3. Other construction and connection relationship are the same as those in Embodiment I.

Embodiment III: this embodiment is further described based on Embodiment I or II, and in this embodiment, each gas distribution branch pipe 3 moves up and down along the height direction of the compost chamber 1 via an elevator mechanism.

The elevator mechanism in this embodiment is a known product. The elevator mechanism is in such a manner that a motor, a bevel gear cluster and a lead screw cooperate with each other to drive each gas distribution branch pipe 3 to move up and down along the lead screw, or the elevator mechanism is in such a manner that a pneumatic piston-type telescopic pole drives the gas distribution branch pipe 3 to move up and down. Other existed elevator mechanisms which can achieve manual or electric control are possible.

Figure 3:
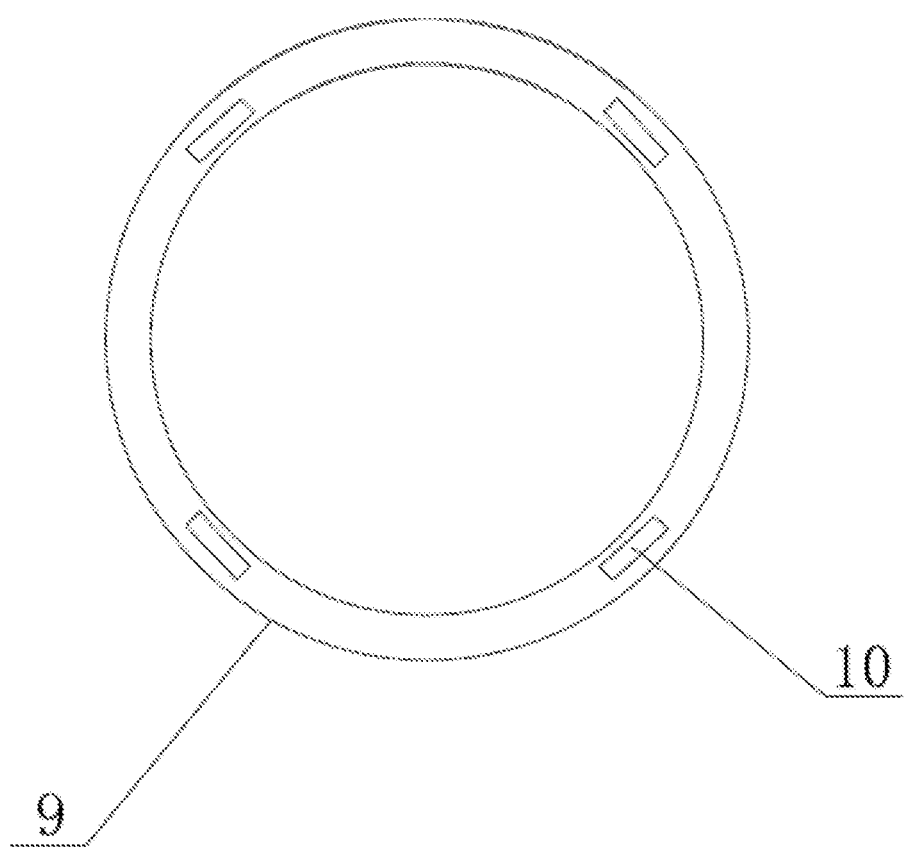
FIG. 3 is a top view of a bottom ring 9.

Embodiment IV: this embodiment is described with reference to FIG. 3, and in this embodiment, one bottom ring 9 is correspondingly disposed at a bottom of each gas distribution branch pipe 3; each bottom ring 9 is configured to be coaxial with its corresponding gas distribution branch pipe 3, and each bottom ring 9 is provided with a plurality of percolate discharge holes 10 along its circumferential direction. Each percolate discharge hole 10 is a slit-shape hole. Other construction and connection relationship are the same as those in Embodiment III.

Embodiment V: this embodiment is described with reference to FIG. 1, and in this embodiment, each percolate discharge hole 10 is disposed along a width direction of the bottom ring 9 in which it is positioned, and the compost bin 2 is in communication with the percolate tank 5 through the plurality of vent holes 8 and the plurality of percolate discharge holes 10 of each gas distribution branch pipe 3. Other construction and connection relationship are the same as those in Embodiment IV.

Embodiment VI: this embodiment is described with reference to FIG. 1, and in this embodiment, a percolate discharge outlet 11 is provided on the percolate tank 5. Other contents not mentioned are the same as those in Embodiment I or V.

Embodiment VII: this embodiment is described with reference to FIGS. 1, 2 and 3, and in this embodiment, the gas distribution method is as follows:

a compost heap 4 in a compost bin 2 produces a pressure due to temperature increase; when the compost heap 4 in the compost bin 2 requires gas supply, a large number of hot gas produced moves up and is discharged out of a compost chamber 1 through a gas outlet 7 as a temperature of the compost heap 4 in the compost bin 2 increases, and air outside the compost chamber 1 is drawn into a plurality of gas distribution branch pipes 3 through an air inlet 6 in a negative pressure oxygen supply manner; at this moment, each gas distribution branch pipe 3 is controlled to move up vertically by an elevator mechanism, such that the air inlet 6, a percolate tank 5 and the plurality of gas distribution branch pipes 3 form an air communication channel; air is drawn from an outside of the compost chamber 1 into the air inlet 6 in a negative pressure oxygen supply manner, and the air passed into the percolate tank 5 through the air inlet 6 is then blown into each gas distribution branch pipe 3 in a positive pressure oxygen supply manner, and finally blown into the compost bin 2, thereby achieving circulating ventilation of the compost bin 2; and when the compost heap 4 in the compost bin 2 does not require gas supply, each gas distribution branch pipe 3 is controlled to move down vertically by the elevator mechanism until the plurality of gas distribution branch pipes 3 move down to be coplanar with a bottom of the compost bin 2, such that a percolate produced by the compost heap 4 in the compost bin 2 is discharged into the percolate tank 5 through a plurality of percolate discharge holes 10 of each gas distribution branch pipe 3, and the percolate in the percolate tank 5 are pooled and finally discharged out of the compost chamber 1 through a percolate discharge outlet 11.

In the present invention, the compost heap 4 in the compost bin 2 causes the increase of the internal temperature of the compost bin 2 because of external temperature increase and fermentation of themselves.

In the present invention, the feature that each gas distribution branch pipe 3 is controlled to move down vertically by the elevator mechanism means the elevator controls each gas distribution branch pipe 3 to move down towards the percolate tank 5.

Embodiment VIII: this embodiment is described with reference to FIGS. 1 and 2, and in this embodiment, when the gas distribution branch pipe 3 moves down to the lowest limiting position, a top of the gas distribution branch pipe 3 is aligned with the bottom of the compost bin 2. The height of the gas distribution branch pipe 3 substantially equals to that of the compost heap 4. Other contents not mentioned are the same as those in Embodiment VII.

Further, it should be noted that particular embodiments, shapes and names of parts and components thereof, and the like described in this specification may be changed. All equivalent or simple changes made according to constructions, features, and principles of the inventive concept of the present invention fall within the protection scope of the present invention. Various modifications, supplements, or replacements can be made by those skilled in the art to the particular embodiments described without departing from the structure of the present invention or the scope defined by the claims, and they all fall within the protection scope of the present invention.

We claim:

1. A vertical gas distribution device for aerobic compost, comprising: a compost chamber, a compost bin, a compost heap, a percolate tank, and a plurality of gas distribution branch pipes, wherein the compost bin is inside the compost chamber, the compost heap is provided in the compost bin, and a gas outlet is provided on a side wall of the compost chamber, the gas outlet being for discharging a hot gas produced as a temperature of the compost heap in the compost bin increases and forms a negative pressure in the compost bin;

a top end of each gas distribution branch pipe is a sealed end, a plurality of vent holes being provided on a side wall of each gas distribution branch pipe, the plurality of gas distribution branch pipes being disposed at a bottom of the compost chamber, each gas distribution branch pipe being movable up and down along a height direction of the compost chamber;

a bottom end of each gas distribution branch pipe is in communication with the percolate tank, the percolate tank being positioned at the bottom of the compost chamber and right under the plurality of gas distribution branch pipes; and an air inlet is provided on a side wall of the percolate tank, the air inlet being for drawing air outside the compost chamber in a negative pressure oxygen supply manner and blowing into each gas distribution branch pipe in a positive pressure oxygen supply manner; and wherein each vent hole of the plurality of vent holes is a tapered hole, an end with a small opening of each vent hole being disposed on an outer wall of the gas distribution branch pipe, and an end with a large opening of each vent hole being disposed on an inner wall of the gas distribution branch pipe.

2. The vertical gas distribution device for aerobic compost according to claim 1, wherein each gas distribution branch pipe is movable up and down along the height direction of the compost chamber via an elevator mechanism.

3. The vertical gas distribution device for aerobic compost according to claim 2, wherein a bottom ring is disposed at a bottom of each gas distribution branch pipe, each bottom ring being coaxial with its corresponding gas distribution branch pipe, and each bottom ring being provided with a plurality of percolate discharge holes along its circumferential direction.

4. The vertical gas distribution device for aerobic compost according to claim 3, wherein each percolate discharge hole is disposed along a width direction of the bottom ring, and the compost bin is in communication with the percolate tank through the plurality of vent holes and the plurality of percolate discharge holes of each gas distribution branch pipe.

5. The vertical gas distribution device for aerobic compost according to claim 1, wherein a percolate discharge outlet is provided on the percolate tank.

* * * * *